United States Patent [19]
Dahlbäck et al.

[11] Patent Number: 5,453,181
[45] Date of Patent: Sep. 26, 1995

[54] DEVICE FOR A GEAR

[75] Inventors: Marten Dahlbäck, Lidingö ; Henrik Fintling, Södertälje, both of Sweden

[73] Assignee: Saab-Scania Aktiebolag, Sweden

[21] Appl. No.: 198,863

[22] Filed: Feb. 18, 1994

[30] Foreign Application Priority Data

Feb. 22, 1993 [SE] Sweden .................. 9300565

[51] Int. Cl.⁶ ................. B01D 35/02; B01D 35/027
[52] U.S. Cl. ................. 210/168; 74/467; 184/6.12; 184/11.1; 184/11.2; 475/203
[58] Field of Search ................. 184/6.12, 11.1, 184/11.2, 13; 74/467; 475/203; 210/168, 171

[56] References Cited

U.S. PATENT DOCUMENTS

| | | | |
|---|---|---|---|
| 2,356,953 | 1/1942 | Snow . | |
| 2,802,548 | 8/1957 | Mart et al. | 184/11.1 |
| 3,502,176 | 3/1970 | Terry | 184/11.1 |
| 3,502,177 | 3/1970 | Christie | 184/11.1 |
| 3,847,249 | 11/1974 | Oehring | 184/11.1 |
| 4,352,301 | 10/1982 | Fleury | 74/467 |
| 4,459,208 | 7/1984 | Lemon . | |
| 5,316,106 | 5/1994 | Baedke et al. | 184/11.1 |

FOREIGN PATENT DOCUMENTS

| | | |
|---|---|---|
| 480039 | 8/1982 | U.S.S.R. . |
| 666914 | 3/1989 | U.S.S.R. . |
| 2204367 | 2/1988 | United Kingdom . |

OTHER PUBLICATIONS

Patent Abstracts of Japan, Cooling Mechanism of Lubricating Fluid in Gear Device, Publication No. JP59001870, Publication Date Jul. 1, 1984.

*Primary Examiner*—Neil McCarthy
*Attorney, Agent, or Firm*—Ostrolenk, Faber, Gerb & Soffen

[57] ABSTRACT

A device for conveying lubricant oil from a gear housing through an external treatment unit for treatment or reconditioning, and back to the gear housing. The gear housing is adapted for being partially filled with a liquid lubricant or oil. The external treatment unit is fixed to the gear housing unit. A rotatable gear wheel in the gear housing moves the lubricant into an inlet duct leading to the external unit. The inlet to the inlet duct is in the vicinity of the periphery of the gear wheel in the gear housing. The inlet into the inlet duct is located generally in the vicinity of the surface of the pool of lubricant and at least in part beneath the surface. A separate outlet connection from the external unit receives reconditioned lubricant. That connection has an outlet back into the gear housing, above the surface of the pool. The inlet and outlet ducts are so sized, shaped and placed that the pressure generated by the kinetic energy of the gear wheel provides a flow through the external unit that also permits or enables the reconditioning action of the external unit. For example, the external unit may comprise an oil filter, or other means for reconditioning the lubricant.

21 Claims, 2 Drawing Sheets

DEVICE FOR A GEAR

BACKGROUND OF THE INVENTION

The present invention relates to a device for conveying lubricant from and to a gear.

The gears, for example the gears in motor vehicles, which are currently available are in most cases lubricated by so-called splash lubrication. This means that the gear housing has an oil sump which is partially filled with oil so that at least one gear wheel is at least partially immersed in the oil. During operation, the gear wheel rotates and oil is therefore splashed up from the sump providing the required lubrication.

This arrangement causes the oil to become increasingly contaminated the longer the gear is in operation, which in turn causes increased wear. In order to reduce this wear, and hence to increase the life of the gear, the oil is changed at suitable intervals during the life of the gear.

One method of extending the life of the gear still further is to arrange a filter on the gear for the purpose of continuously cleaning the oil. This is done today, for example, in some vehicle gearboxes. Such a solution may even allow a longer operating time between the required servicings of the engine, which are both expensive and time consuming. However, such a solution means that the oil must be pumped through the filter by means of a pumping device, which requires an expensive and complicated gear design.

For central gears arranged on the drive shaft of the motor vehicle, the problem is particularly serious because in most cases only splash lubrication is used without any form of filtration.

German published specification DE 40 23 364 shows a design in which the crown wheel of the central gear throws oil up to a reservoir arranged inside the gear housing. The oil is then fed down from the reservoir via pipes for lubricating parts that are difficult to reach, such as hub bearings, from which the oil then returns to the oil sump. According to this design, kinetic energy from the crown wheel is converted by the displacement of the oil to potential energy to allow lubrication. Thus, there is no filtration or other reconditioning of the oil.

The foregoing reasoning also applies to types of lubricating oil reconditioning other than filtration, for example cooling of the oil by allowing it to be fed through an external cooling pipe.

German published specification DE 31 16 595 shows a design for cooling the lubricating oil for the central gear of a vehicle. The design provides a cooling pipe which is arranged partly inside and partly outside the gear housing. The cooling pipe is closed and contains a coolant for cooling the lubricating oil. This solution cannot be adapted to other types of reconditioning because oil does not flow through the cooling pipe.

SUMMARY OF THE INVENTION

It is an object of the present invention to provide, by simple means, a solution for reconditioning the lubricating oil for a gear without requiring major, expensive modifications to the gearbox design.

For this purpose, the device according to the invention comprises a device for conveying lubricant from a gear housing through an external treatment unit for treatment or reconditioning, and back to the housing. The gear housing is adapted for being partially filled with a liquid lubricant or oil. An external unit is fixed to the gear housing and includes means therein for reconditioning the lubricant which passes through the external unit. A rotatable gear wheel is supported in the gear housing for rotation. The gear wheel is so located in the gear housing that it contacts the lubricant which partially fills the gear housing and moves the lubricant up out of the pool of lubricant in the housing into an inlet duct leading to the external unit. The gear supplies the kinetic energy for conveying the lubricant through the external unit.

The inlet duct to the external unit has its lubricant inlet in the vicinity of the periphery of the gear wheel in the gear housing. The inlet duct has an axial extension in an essentially tangential direction of the gear wheel and extends generally counter to the usual direction of rotation of the wheel. In particular, the lubrication oil flow inlet to the inlet duct has a direction that is an essentially tangential direction of the gear wheel, such that the gear wheel rotating through the lubricant moves the lubricant into the inlet duct with kinetic energy. The inlet to the inlet duct is so oriented that the lubrication oil flow into the inlet has an essentially tangential direction of the gear wheel. The inlet into the inlet duct is located generally in the vicinity of the surface of the pool of lubricant with which the gear housing is partially filled and at least in part beneath the surface of that pool. The inlet duct extends from its inlet through the gear housing and to the external unit for delivering the lubricant for reconditioning.

There is a separate outlet connection from the external unit having a separate inlet thereto located in the external unit which receives the reconditioned lubricant. That outlet connection has an outlet for conveying the lubricant from the external unit back into the gear housing. The outlet connection from the external unit to the gear housing is a second duct having an outlet located above the surface of the pool. A cover over the outlet connection keeps the flows separate, preventing inlet through the outlet duct.

The inlet and outlet ducts are so sized, shaped placed and directed that the pressure generated by the kinetic energy of the gear wheel provides a flow through the external unit that also permits or enables the reconditioning action of the external unit. For example, the external unit may comprise an oil filter, or other means for reconditioning the lubricant.

By designing the gear housing with an inlet duct for feeding lubricating oil to the reconditioning unit and another outlet duct for feeding the lubricant back to the gear housing, and by transmitting kinetic energy from a gear wheel incorporated in the gear to the lubricating oil, only minor modifications need be made to a conventional gear housing to provide reconditioning of the oil. The duct which feeds lubricant to the reconditioning unit has an inlet in the vicinity of, and directed along the periphery of and essentially along a tangent to, the gear wheel. The losses in flow energy are thereby reduced to a minimum.

In one embodiment, the filter or other reconditioning unit is fixed to the gear housing by a connecting unit which is arranged so that it can be mounted separately, incorporating ducts for feeding the oil between the gear housing and the filter.

This design is particularly advantageous in the central gear of a motor vehicle where the crown wheel can be used as a source of energy.

The additional features and advantages of the invention are indicated in the attached description of an embodiment where reference is made to the attached drawing Figures, in

DESCRIPTION OF A PREFERRED EMBODIMENT

Figure 1:
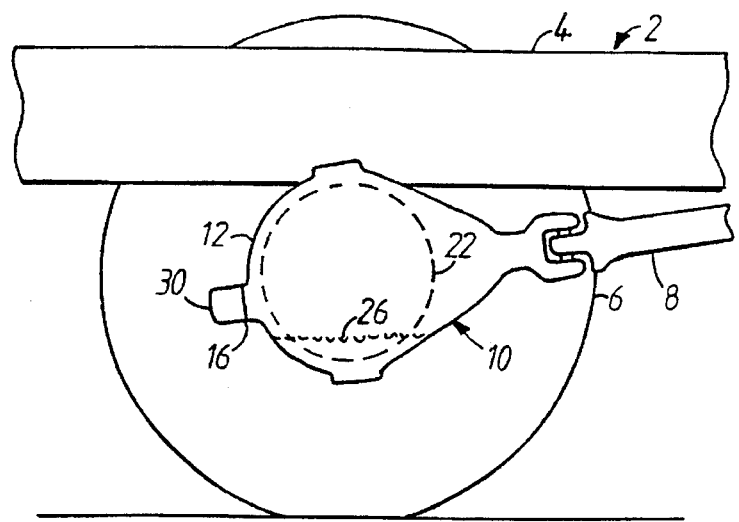
FIG. 1 shows a diagrammatic side view of part of a road vehicle including a central gear fitted with the device according to the invention.

FIG. 1 shows the rear section of an automotive vehicle frame 4, here a frame belonging to a truck 2. The driving force for the truck 2 is generated conventionally in a drive unit (not shown), for example a diesel engine, and that force is transmitted rearwardly via a propeller shaft arrangement in the forward part of the vehicle, to a gear 10 in the form of a central gear incorporating, among other things, a gear housing 12 and a gear wheel 22, here shown in the form of a crown wheel. Crown wheel 22 is conventionally connected, so that it transmits torsional force to the drive shaft (not shown) via a differential (not shown), and the task of the crown wheel is to transmit the torque from the propeller shaft 8 to the drive shaft and the drive wheels 6 arranged on that shaft (only one wheel shown). During vehicle travel, the crown wheel 22 shown in FIG. 1 normally rotates clockwise if a forward drive gear is engaged and counterclockwise if a reverse drive gear is engaged.

Central gear 10 is lubricated with oil from an oil sump 26 located in the bottom of gear housing 12, by splash lubrication. The gear housing is only partially filled up to a predetermined level of liquid. The lubricating oil is filtered when the rotary crown wheel 22, during forward travel of the vehicle, throws or pushes up lubricating oil, which oil is fed through a mounting section 16 which is arranged in the rear half of the gear housing 12, to an external oil filter 30. After passing through the filter 30, the oil is returned to the gear housing 12.

If required, the filter 30 may be replaced by any other reconditioning unit, for example a venting unit or an oil cooling pipe.

Figure 2:
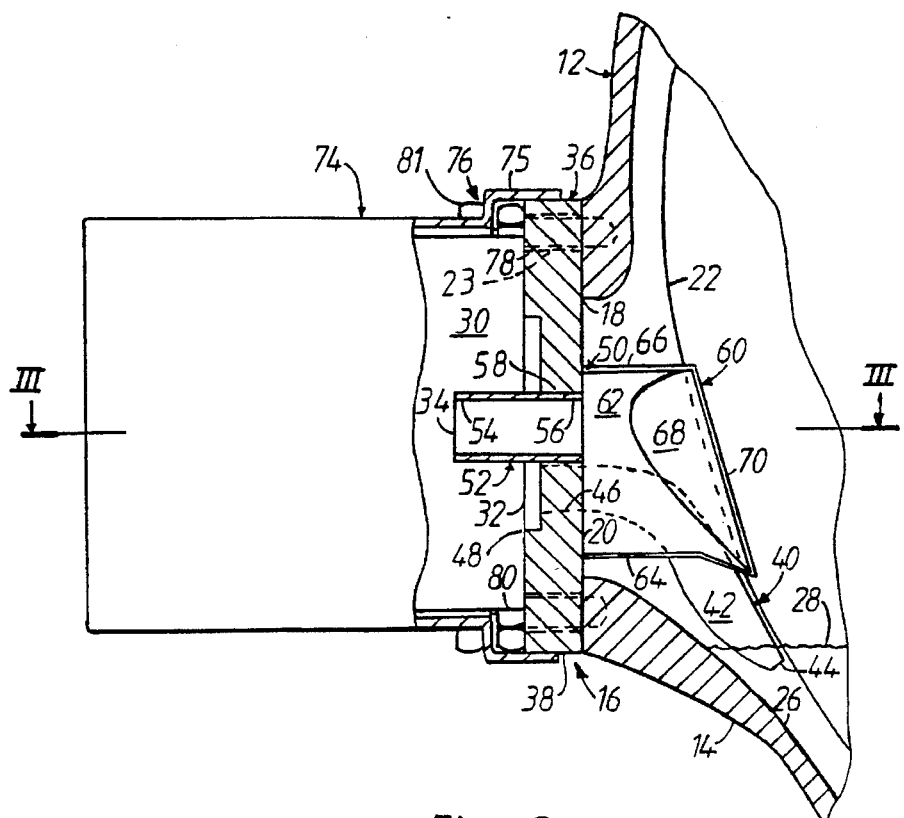
FIG. 2 shows an enlarged view of the device according to the invention, essentially divided into sections in a longitudinal vertical plane of the vehicle, the plane represented in FIG. 3 by II—II.
Figure 3:
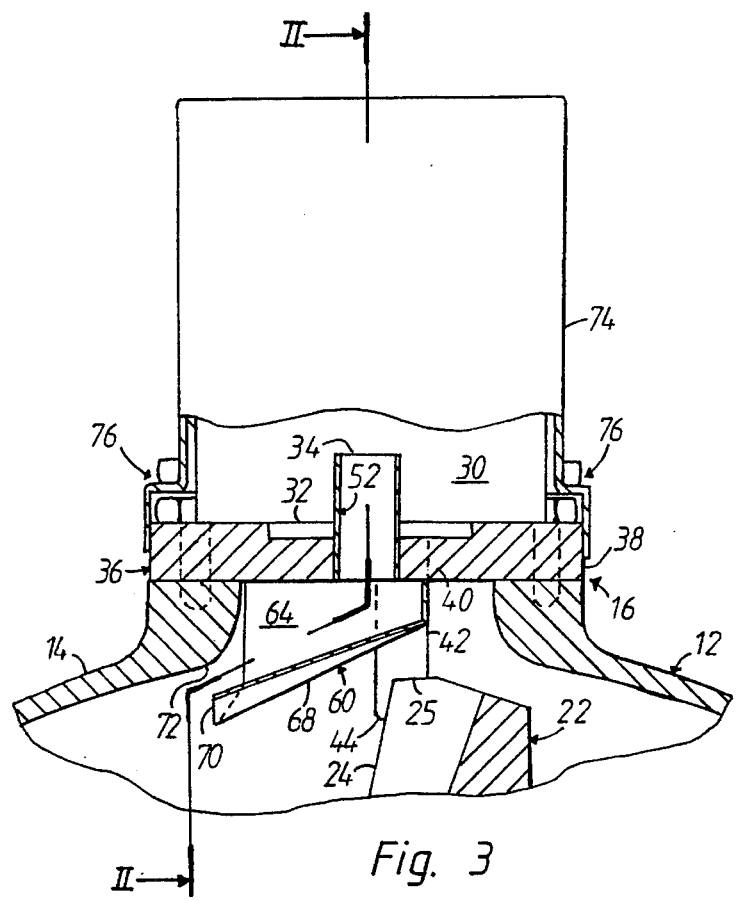
FIG. 3 shows an enlarged elevation of the device along the plane represented by III—III in FIG. 2.

FIGS. 2 and 3 show sectional views of the rear section of gear housing 12, oil filter 30 and parts of crown wheel 22. FIG. 2 only shows the peripheral line of the crown wheel 22, and FIG. 3 shows an incorporated tooth 24.

Oil filter 30 is of conventional prior art and is secured to a mounting section 16 of the gear housing 12. Mounting section 16 here comprises a connecting unit 36 which is arranged so that it can be separately assembled. Oil filter 30 is essentially cylindrical in shape and has a central oil outlet 34 and an external oil inlet 32 coaxial with outlet 34.

Connecting unit 36 is secured to the gear housing 12 at a rearwardly directed hole 18 through the wall 14 of the gear housing 12. Gear housing 12 has an essentially flat contact surface 20 facing connecting unit 36 and located in an essentially vertical plane perpendicular to the forward direction of the vehicle.

Figure 4:
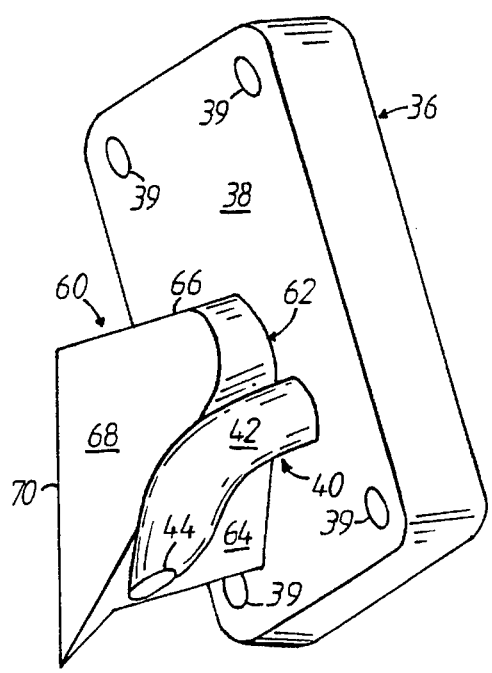
FIG. 4 shows a perspective view of a connecting unit according to the invention.

Connecting unit 36 is also shown separately in FIG. 4. The unit incorporates as its essential components a fixing plate 38, a duct 40, referred to in the following as an inlet duct, designed to feed lubricating oil from gear housing 12 to oil filter 30, and a connection designed as a second duct 50 and hereinafter referred to as an outlet duct, designed to feed the lubricating oil from the filter back to gear housing 12.

Inlet duct 40 is comprised of a pipe section 42, with an inlet 44 located in the vicinity of the periphery of crown wheel 22, at a point in the vicinity of and preferably just below the surface 28 of the pool of lubricant oil in oil sump 26. A hole 46 passes through fixing plate 38. This hole leads to an outlet section 48 in the form of a circular groove designed to enable oil to be fed along the entire surface of oil inlet 32 of filter 30. Inlet duct 40 is essentially continuously rising from inlet 44 to outlet 48. An axial extension of the inlet duct is essentially tangential in direction with respect to the gear wheel and is essentially counter to its usual rotation direction. The inlet 44 for the lubrication oil flow opens in a direction which is essentially on a tangent to the gear wheel. This or an alternate design of the inlet duct and its inlet are selected so that the lubrication oil flows into the inlet in an essentially tangential direction with respect to the gear wheel.

Outlet duct 50 comprises a cylindrical, externally threaded pipe 52 and a control cover 60. Pipe 52 has an inlet section 54 securely threaded onto oil outlet 34 of filter 30 and an outlet section 56 securely threaded in a hole 58 designed for this purpose and passing through connecting unit 36. The most important task of control cover 60 is to prevent oil thrown up by the crown wheel 22 from being fed into filter 30 via outlet duct 50.

Oil filter 30 is securely threaded to pipe 52, and is therefore fixed to connecting unit 36, which is in turn secured to gear housing 12 by means of a number of fastening elements 76, here four stud bolts 78 with a first set of interacting nuts 80 and holes 23 passing through connecting unit 36. Fastening elements 76 also secure a protective cap 74 to gear housing 12 with a second set of nuts 81. The task of protective cap 74 is to protect filter 30 from dirt and any other foreign objects or influence, e.g. objects from the road surface.

Connecting unit 36 may be comprised of a first part containing pipe section 42 of inlet duct 40, control cover 60 and a thin part of fixing plate 38, cast in plastic, and a second part containing the rest of fixing plate 38 and comprised of metal. Alternatively, the parts mentioned may consist of a single plastic or metal part cast in one piece. As an alternative embodiment pipe section 42 and control cover 60 can be welded to fixing plate 38. Connecting unit 36 may be designed according to further alternative forms, enabling its component parts to assume shapes other than those described in this description, depending among other things on the choice of production method.

Inlet 44 of inlet duct 40 is located in the vicinity of the periphery of crown wheel 22, preferably at a distance of only a few millimeters from it, at a point below and in the vicinity of surface 28 of the pool of lubricating oil with which the gear housing is only partially filled. The inlet duct essentially is on a tangent with respect to the gear wheel. Therefore, the gear wheel urges the oil into the inlet from beneath the surface of the lubricant pool. Inlet 44 should be directed to open in the tangential direction of crown wheel 22, and the pipe section 42 should be rising and slightly bent throughout its extension, all this to ensure the smallest possible losses in flow energy through inlet duct 40. Pipe section 42 should also have a relatively large diameter for the purpose of reducing laminar flow losses.

The optimum area of inlet 42 does not depend on the diameter of pipe section 42 but is determined by the pressure drop of the system. A small inlet area gives rise to a high static pressure with a low flow rate, while a larger area gives rise to a lower static pressure but a higher flow rate, provided that there is no drop in pressure. In practice, however, there is always a certain pressure drop over filter 30, due among other things to its degree of blocking. In order to obtain a predetermined filtration efficiency, a certain minimum pressure is required towards the inlet area, which should therefore be as large as possible without the pressure dropping below this minimum value. The efficiency is defined as volume of flow per unit of time, i.e. flow, and is dependent on certain conditions such as oil quality, oil temperature, the speed of rotation of crown wheel 22 and pressure drop over filter 30, which in turn depends, as already mentioned, on the degree of blocking, among other things. The area of inlet 44 can therefore be adapted to give a flow through filter 30 which corresponds to a predetermined efficiency under predetermined conditions.

In order to obtain as favorable a flow pattern as possible around the inlet, inlet 44 should also be located a sufficient distance from gear housing wall 14 that the quantity of oil whose flow pattern is influenced by wall 14 is not fed into inlet duct 40. Tests have shown that the highest flow through inlet duct 40 is obtained when inlet 44 is positioned laterally and essentially opposite outer tooth edge 25 of crown wheel 22, which is shown most clearly in FIG. 3.

Control cover 60 of outlet duct 50 has two tasks. First, it feeds the filtered oil to a point in gear housing 12 where it is not fed immediately back into inlet duct 40. This prevents the same limited quantity of oil from being continually fed through filter 30. Secondly, it prevents lubricating oil thrown up by crown wheel 22 from being fed into filter 30 through outlet duct 50. Control cover 60 therefore contains a first wall section 62, which may be said to comprise a floor section 64 and roof section 66, where the floor section 64 prevents oil from being fed "the back way" through filter 30. Control cover 60 also contains a second wall section 68, directed mainly in a vertical plane. The wall 68 has an outer edge 70 with a slightly longer extension than floor section 64. The oil is guided through a gap 72, which may be said to constitute an outlet, between this outer edge 70 and gear housing wall 14. This causes the oil to be thrown in a direction away from the inlet 44 of inlet duct 40.

The device described above can be assembled by the following method:

Oil filter 30 is first bolted onto connecting unit 36 at externally threaded pipe 52. Then connecting unit 36 is fitted to stud bolts 78 tightened in gear housing 12, and is secured with the first set of nuts 80. Protective cap 74 is then fitted and secured to gear housing 12 by means of the second set of nuts 81. Protective cap 74 is suitably provided with a section 75 partially projecting from fixing plate 38, for improved sealing. For further improved sealing properties, the first set of nuts 80 can be recessed in fixing plate 38.

When the filter is changed, protective cap 74 is removed, whereupon filter 60 can be removed and replaced without the need for removing connecting unit 36. This reduces the risk of dirt penetrating gear housing 12.

As mentioned earlier, it is advantageous if inlet 44 of inlet duct 40 is located as close to crown wheel 22 as possible.

The relatively wide tolerances provided in central gears, and also the choice of crown wheel, may give rise to variations in the distance between the periphery of crown wheel 22 and wall 14 of gear housing 12. To obtain an optimum distance between crown wheel 22 and inlet 44, a number of spacers can be positioned between flat section 38 of connecting unit 36 and contact surface 20 of gear housing 12. According to an alternative design, pipe section 42 of inlet duct 40 can be separated from fixing plate 38 and during assembly can be pressed onto a pipe connector fixed to fixing plate 38 until the desired position between crown wheel 22 and inlet 44 is achieved.

According to the embodiment described above, the lubricating oil can only be filtered when the vehicle is travelling forward, and at a minimum speed. However, tests have shown that despite this, sufficient filtration is achieved in most types of loads found in different types of trucks, due among other things to the fact that the vehicles frequently driven at low speed are provided with such a gear reduction, e.g. by means of hub gears, that the peripheral speed of the crown wheel is largely the same as in faster vehicles.

In applications where the crown wheel or gear unit also rotates in the other direction for a large portion of the operating time, a further device according to the invention can be positioned on the opposite side of the gear housing, which enables the lubricating oil to be filtered during both directions of rotation.

In applications without a crown wheel or where it is unsuitable to use the crown wheel, any other gear wheel part of the transmission can be used.

As is evident from the above description, only minor modifications to an existing central gear housing need be made to enable the vehicle to be equipped with the device according to the invention. Furthermore, a gear housing prepared for the device, and therefore provided with hole 18, but where the filtration device is not required for some reason, can be easily adapted to this by sealing the hole with a cover instead of fitting a connecting unit. The device according to the invention can also be used for types of lubricating oil reconditioning other than filtration, e.g. cooling or venting, by a method of prior art.

The embodiment described above must not impose any limits on the invention, which can be implemented according to alternative forms in which similar problems and conditions exist without departing from the concept of the invention. Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for conveying lubricant from a gear housing through an external treatment unit, the device comprising:

a gear housing adapted for being partially filled with a pool of liquid lubricant;

an external unit fixed to the gear housing to which the lubricant is to be conveyed for treatment in the external unit and from which the treated lubricant is to be conveyed back to the gear housing;

a rotatable gear wheel supported for rotation in the gear housing in a direction of rotation and at a location in the gear housing such that the gear wheel contacts lubricant partially filling the gear housing and moves the lubricant in the housing, the gear wheel supplies kinetic energy for conveying the lubricant;

an inlet duct having an inlet, the inlet duct extending from the inlet through the gear housing to the external unit for delivering the lubricant for treatment from the gear housing into the external unit, the inlet of the inlet duct being located in the vicinity of a periphery of the gear wheel and in the gear housing, the inlet being positioned, and the inlet duct having a direction such that:
(i) the lubricant flows into the inlet in a direction essentially tangential to the gear wheel periphery; and
(ii) the kinetic energy from the gear wheel rotating through the lubricant conveys the lubricant through the external unit for treatment; and an outlet connection having an outlet duct opening into the external unit for receiving treated lubricant from the external unit and for conveying the lubricant from the external unit back into the gear housing.

2. The device of claim 1, wherein the gear housing has a mounting section which comprises the inlet duct to the external unit and comprises the outlet connection from the external unit back to the gear housing; the external unit being mounted to the mounting section of the gear housing.

3. The device of claim 2, wherein the mounting section of the gear housing comprises a separate connecting unit arranged on the gear housing and the gear housing having an opening therein over which the separate connecting unit is disposed.

4. The device of claim 1, wherein the external unit comprises an oil filter, to which both the inlet duct and the outlet connection are connected.

5. The device of claim 1, wherein the inlet to the inlet duct has an inlet area selected so that pressure generated in lubricant within the duct by the kinetic energy of the rotation of the gear wheel provides a flow through the external unit that causes treatment action of lubricant in the external unit.

6. The device of claim 5, wherein the external unit comprises an oil filter, to which both the inlet duct and the outlet connection are connected.

7. The device of claim 5, wherein the inlet to the inlet duct is located in the vicinity of the surface of the pool of lubricant with which the gear housing is partially filled.

8. The device of claim 7, wherein the direction in which the inlet duct opens is counter to the direction of rotation.

9. The device of claim 7, wherein the outlet connection from the external unit to the gear housing comprises an outlet duct having an outlet located above the surface of the pool of lubricant with which the gear housing is partially filled, and wherein the inlet duct and the outlet duct are respectively so sized that the pressure generated by the kinetic energy produced by the gear wheel provides a flow through the external unit for causing treatment action of the lubricant and for moving the lubricant through the inlet duct and through the outlet connection back into the gear housing.

10. The device of claim 5, wherein the direction in which the inlet duct opens is counter to the direction of rotation.

11. The device of claim 1, wherein the inlet to the inlet duct is located generally in the vicinity of the surface of the pool of lubricant with which the gear housing is partially filled.

12. The device of claim 11, wherein the inlet is at least in part below the surface of the pool of lubricant with which the gear housing is partially filled.

13. A device for conveying lubricant from a gear housing through an external treatment unit, the device comprising:

a gear housing adapted for being partially filled with a pool of liquid lubricant;

an external unit fixed to the gear housing to which the lubricant is to be conveyed for treatment in the external unit and from which the treated lubricant is to be conveyed back to the gear housing;

a rotatable gear wheel supported for rotation in the gear housing in a direction of rotation at a location in the gear housing such that the gear wheel contacts lubricant partially filling the gear housing and moves the lubricant in the housing, such that the gear wheel supplies kinetic energy for conveying the lubricant; and a mounting section on the gear housing comprising:

an inlet duct having an inlet, the inlet duct extending from the inlet through the gear housing to the external unit for delivering the lubricant for treatment from the gear housing into the external unit, the inlet of the inlet duct being located in the vicinity of a periphery of the gear wheel and in the gear housing, the inlet being positioned, and the inlet duct having a direction such that:
(i) the lubricant flows into the inlet in a direction essentially tangential to the gear wheel periphery; and
(ii) the kinetic energy from the gear wheel rotating through the lubricant conveys the lubricant from the inlet through the inlet duct to the external unit, for delivering the lubricant for treatment from the gear housing into the external unit; and an outlet connection having an outlet duct opening into the external unit for receiving treated lubricant from the external unit and conveying the lubricant from the external unit back into the gear housing, the outlet duct opening into the gear housing at a position located above the surface of the pool of lubricant with which the gear housing is partially filled.

14. The device of claim 1, wherein the outlet duct of the outlet connection from the external unit to the gear housing is located above the surface of the pool of lubricant with which the gear housing is partially filled.

15. The device of claim 14, wherein the outlet duct is shaped so as to direct the lubricant into the gear housing at a location such that it is not directly taken up by the inlet to the inlet duct.

16. The device of claim 11, wherein the gear wheel comprises a crown wheel.

17. The device of claim 11, wherein the inlet has an axial extension in an essentially tangential direction of the gear wheel.

18. The device of claim 1, wherein the gear wheel comprises a crown wheel.

19. The device of claim 18, wherein the gear wheel is included within a central gear for a vehicle.

20. The device of claim 18, wherein the direction of the inlet duct is counter to the direction of rotation of the gear wheel.

21. The device of claim 1, wherein the inlet duct has a through flow area, the area of the inlet being less than the through flow area of the inlet duct.

* * * * *